US007336289B2

(12) United States Patent
Ishikawa et al.

(10) Patent No.: US 7,336,289 B2
(45) Date of Patent: Feb. 26, 2008

(54) PROJECTION TYPE DISPLAY APPARATUS

(75) Inventors: Hidenori Ishikawa, Kanagawa (JP); Yoshiaki Kumagai, Kanagawa (JP); Akihiko Tsurishima, Tokyo (JP); Shunichi Hashimoto, Kanagawa (JP); Akira Masutani, Kernen (DE)

(73) Assignees: Sony Corporation, Tokyo (JP); Sony Deutschland GmbH, Cologne (DE)

( * ) Notice: Subject to any disclaimer, the term of this patent is extended or adjusted under 35 U.S.C. 154(b) by 112 days.

(21) Appl. No.: 10/493,850

(22) PCT Filed: Aug. 27, 2003

(86) PCT No.: PCT/JP03/10870

§ 371 (c)(1),
(2), (4) Date: Sep. 27, 2004

(87) PCT Pub. No.: WO2004/021079

PCT Pub. Date: Mar. 11, 2004

(65) Prior Publication Data

US 2005/0036084 A1    Feb. 17, 2005

(51) Int. Cl.
*G09G 5/02* (2006.01)
(52) U.S. Cl. ............................. 345/698; 345/6; 345/87; 348/751; 348/766
(58) Field of Classification Search ................ 348/744, 348/751, 766; 349/14; 353/50–51, 79–80; 345/6, 87, 698
See application file for complete search history.

(56) References Cited

U.S. PATENT DOCUMENTS 5,128,662 A * 7/1992 Failla .......................... 345/1.3

(Continued)

FOREIGN PATENT DOCUMENTS

EP    0 445 425    9/1991

(Continued)

OTHER PUBLICATIONS

Patent Abstracts of Japan, vol. 014, No. 362 (E-0960), Aug. 6, 1990 & JP 02 127882 A (Sony Corp), May 16, 1990.

*Primary Examiner*—Amr A. Awad
*Assistant Examiner*—Michael Pervan
(74) *Attorney, Agent, or Firm*—Frommer Lawrence & Haug LLP; William S. Frommer; Thomas F. Presson

(57) ABSTRACT

A projection type display apparatus that projects video onto a screen includes a liquid crystal panel using polymer-dispersed liquid crystal that disperses light when a voltage is applied and that transmits light when a voltage is not applied, being attached to an apparatus body 2 as a screen 1; and the video output from the apparatus body 2 is projected onto the screen 1 from the front side. Accordingly, there is provided the projection type display apparatus suitable for use in small space such as at home, in which a place for setting the apparatus is flexibly selected and the feeling of oppression is mitigated when the apparatus is not used.

16 Claims, 13 Drawing Sheets

U.S. PATENT DOCUMENTS

| | | | |
|---|---|---|---|
| 5,249,049 A * | 9/1993 | Kranawetter et al. | 348/473 |
| 5,285,268 A | 2/1994 | Nakagaki et al. | |
| 5,305,126 A * | 4/1994 | Kobayashi et al. | 349/94 |
| 5,386,252 A | 1/1995 | Oku | |
| 5,437,811 A * | 8/1995 | Doane et al. | 252/299.01 |
| 6,525,750 B1 * | 2/2003 | Knox | 345/30 |
| 2002/0043557 A1 * | 4/2002 | Mizoguchi et al. | 235/375 |
| 2002/0196243 A1 * | 12/2002 | Morita | 345/204 |
| 2003/0020885 A1 | 1/2003 | Suzuki | |

FOREIGN PATENT DOCUMENTS

| | | |
|---|---|---|
| EP | 0 961 502 | 12/1999 |
| JP | 8-194202 | 7/1996 |
| JP | 2001-75533 | 3/2001 |

* cited by examiner (When Voltage Applied)

(When Voltage Not Applied)

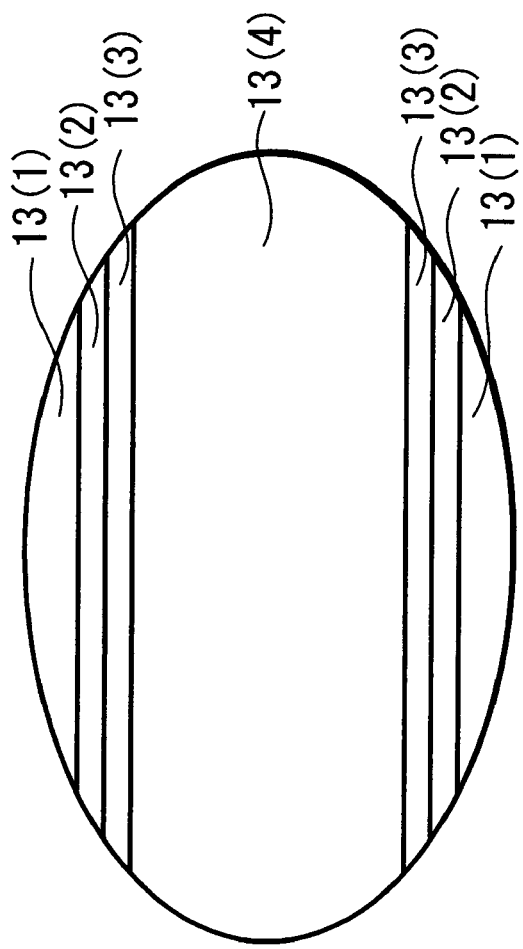
FIG. 4A  ITO Electrode Group 13
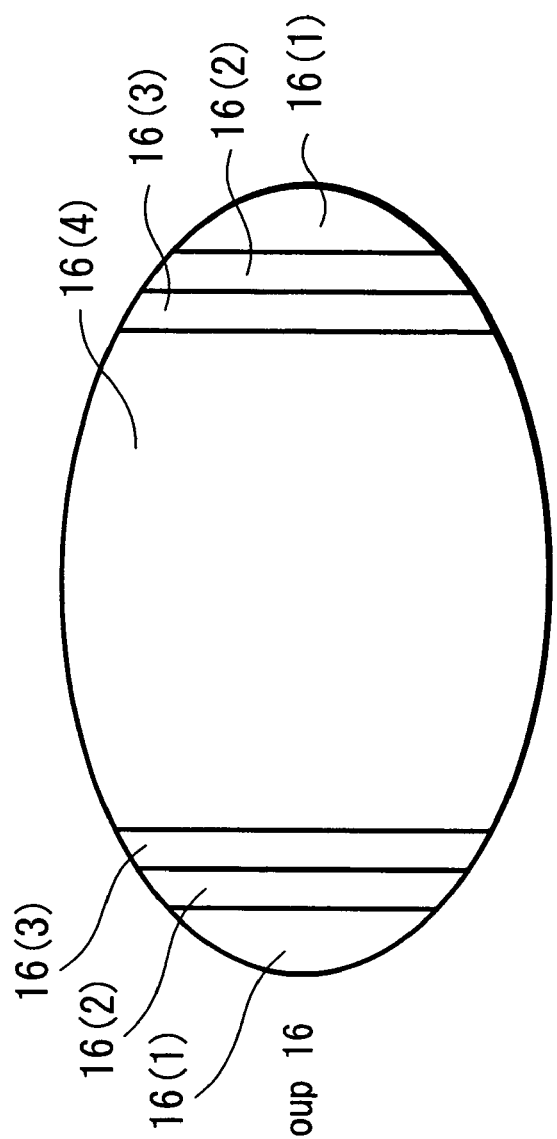
FIG. 4B  ITO Electrode Group 16

Electrodes 13(2) to 13(4)
And Electrode 16(4)

Electrodes 13(3), 13(4)
And Electrodes 16(3), 16(4)

Electrode 13(4) And
Electrodes 16(2) to 16(4)

| Aspect Ratio | Zoom Ratio |
|---|---|
| 4:3 (NTSC/PAL) | A |
| 16:9 (Hi-Vision) | 1.17A |
| 2.35:1 (Cinemascope) | 1.31A |

FIG. 11

| a | b | p | a/b | Area S1 | Area of Screen |
|---|---|---|---|---|---|
| 5.5 | 4.371 | 4.48927 | 1.258306 | 5.65 | 18.88 |
| 5.55 | 4.328 | 4.501052 | 1.282467 | 5.60 | 18.86 |
| 5.6 | 4.287 | 4.512609 | 1.306395 | 5.55 | 18.85 |
| 5.65 | 4.248 | 4.523946 | 1.3301 | 5.52 | 18.85 |
| 5.7 | 4.211 | 4.535069 | 1.353596 | 5.49 | 18.85 |
| 5.75 | 4.176 | 4.545982 | 1.376893 | 5.46 | 18.86 |
| 5.8 | 4.143 | 4.556691 | 1.4 | 5.45 | 18.87 |
| 5.85 | 4.111 | 4.567199 | 1.422927 | 5.43 | 18.89 |
| 5.9 | 4.081 | 4.577511 | 1.445683 | 5.42 | 18.91 |
| 5.95 | 4.052 | 4.587632 | 1.468276 | 5.42 | 18.94 |
| 6 | 4.025 | 4.597566 | 1.490712 | 5.42 | 18.97 |
| 6.05 | 3.999 | 4.607317 | 1.512999 | 5.43 | 19.00 |
| 6.1 | 3.974 | 4.61689 | 1.535144 | 5.44 | 19.04 |
| 6.15 | 3.950 | 4.626287 | 1.557152 | 5.45 | 19.08 |
| 6.2 | 3.926 | 4.635514 | 1.579029 | 5.46 | 19.12 |
| 6.25 | 3.904 | 4.644574 | 1.600781 | 5.48 | 19.17 |
| 6.3 | 3.883 | 4.65347 | 1.622412 | 5.50 | 19.21 |
| 6.35 | 3.863 | 4.662206 | 1.643928 | 5.53 | 19.26 |
| 6.4 | 3.843 | 4.670786 | 1.665333 | 5.56 | 19.32 |
| 6.45 | 3.824 | 4.679214 | 1.68663 | 5.58 | 19.37 |
| 6.5 | 3.806 | 4.687491 | 1.707825 | 5.62 | 19.43 |

FIG. 12

| a | b | p | a/b | Area S1 | Area of Screen |
|---|---|---|---|---|---|
| 5.5 | 4.371 | 4.848675 | 1.258306 | 5.13 | 18.88 |
| 5.55 | 4.328 | 4.871755 | 1.282467 | 5.06 | 18.86 |
| 5.6 | 4.287 | 4.894539 | 1.306395 | 4.99 | 18.85 |
| 5.65 | 4.248 | 4.917031 | 1.3301 | 4.93 | 18.85 |
| 5.7 | 4.211 | 4.939234 | 1.353596 | 4.88 | 18.85 |
| 5.75 | 4.176 | 4.961152 | 1.376893 | 4.83 | 18.86 |
| 5.8 | 4.143 | 4.982789 | 1.4 | 4.79 | 18.87 |
| 5.85 | 4.111 | 5.004148 | 1.422927 | 4.75 | 18.89 |
| 5.9 | 4.081 | 5.025233 | 1.445683 | 4.72 | 18.91 |
| 5.95 | 4.052 | 5.046048 | 1.468276 | 4.69 | 18.94 |
| 6 | 4.025 | 5.066595 | 1.490712 | 4.67 | 18.97 |
| 6.05 | 3.999 | 5.086879 | 1.512999 | 4.65 | 19.00 |
| 6.1 | 3.974 | 5.106902 | 1.535144 | 4.63 | 19.04 |
| 6.15 | 3.950 | 5.126669 | 1.557152 | 4.62 | 19.08 |
| 6.2 | 3.926 | 5.146183 | 1.579029 | 4.61 | 19.12 |
| 6.25 | 3.904 | 5.165446 | 1.600781 | 4.60 | 19.17 |
| 6.3 | 3.883 | 5.184464 | 1.622412 | 4.60 | 19.21 |
| 6.35 | 3.863 | 5.203237 | 1.643928 | 4.60 | 19.26 |
| 6.4 | 3.843 | 5.221771 | 1.665333 | 4.60 | 19.32 |
| 6.45 | 3.824 | 5.240068 | 1.68663 | 4.61 | 19.37 |
| 6.5 | 3.806 | 5.258131 | 1.707825 | 4.61 | 19.43 |

FIG. 13

| Aspect Ratio | Screen Drive Voltage |
|---|---|
| 4:3 (NTSC/PAL) | Apply between Electrodes 13(2) to 13(4) And Electrode 16(4)<br>Apply between Electrode 13(1) And Electrodes 16(1) to 16(3) |
| 16:9 (Hi-Vision) | Apply between Electrodes 13(3), 13(4) And Electrodes 16(3), 16(4)<br>Apply between Electrodes 13(1), 13(2) And Electrodes 16(1), 16(2) |
| 2.35:1 (Cinemascope) | Apply between Electrode 13(4) And Electrodes 16(2) to 16(4)<br>Apply between Electrodes 13(1) to 13(3) And Electrode 16(1) |

FIG. 15

| Aspect Ratio | Screen Drive Voltage |
|---|---|
| 4:3 (NTSC/PAL) | Apply between Electrodes 13(2) to 13(4) And Electrodes 16(1) to 16(3)<br>Apply between Electrode 13(1) And Electrode 16(4) |
| 16:9 (Hi-Vision) | Apply between Electrodes 13(3), 13(4) And Electrodes 16(1), 16(2)<br>Apply between Electrodes 13(1), 13(2) And Electrodes 16(3), 16(4) |
| 2.35:1 (Cinemascope) | Apply between Electrode 13(4) And Electrode 16(1)<br>Apply between Electrodes 13(1) to 13(3) And Electrodes 16(2) to 16(4) |

PROJECTION TYPE DISPLAY APPARATUS

TECHNICAL FIELD

The present invention relates to a projection type display apparatus, particularly, to the apparatus suitable for use in comparatively small space such as at home.

BACKGROUND ART

A projection type display apparatus such as a liquid crystal projector or the like has been widely used as a video display apparatus having a large-sized screen.

There have been known conventional projection type display apparatuses, one of which is classified as a front type (front projection type) in which from the front surface video is projected onto a reflective type screen provided separately from a projection type display apparatus, and the other of which is a rear type (rear projection type) in which from the rear surface video is projected onto a transmissive type screen integrally provided with a projection type display apparatus.

Conventionally, when a front projection type display apparatus is set at home, in general, a reflective screen is attached on a wall in a living room or the like and the front projection type display apparatus is set at the position where video can be projected onto this reflective screen.

Also, a conventional rear projection type display apparatus contains all parts of the light pass from a projection lens to a transmissive screen in a housing thereof, so that the apparatus has a large-sized box shape (for example, several ten centimeters in depth and about one meter in both the length and the width). As a result, a conventional rear projection type display apparatus is set at a corner or the like of a living room at home, in general.

Further, at home due to the limitation of a size of wall where such reflective screen can be attached, a place for setting a conventional front projection type display apparatus may not freely selected at home.

Furthermore, in case that a reflective type screen is attached on a wall at home, when video is not projected on the screen (at the time when the front projection type display apparatus is not used), due to conspicuousness of this screen the feeling of uncomfortable oppression is given to the living environment.

Also, regarding a conventional large-sized rear projection type display apparatus, there isn't much choice on a place where the apparatus can be set at home and the feeling of uncomfortable oppression is given to the living environment when the apparatus is not used.

In light of the above, the present invention is to provide a projection type display apparatus suitable for use in a comparatively small space such as at home, in which a place for setting the apparatus is more freely selected and a feeling of oppression is mitigated when the apparatus is not used.

DISCLOSURE OF THE INVENTION

In order to solve the above problems, applicants of the present invention provide a projection type display apparatus that projects video onto a screen, in which a liquid crystal panel using polymer-dispersed liquid crystal that disperses light when a voltage is applied thereto and that transmits light when a voltage is not applied thereto is attached as a screen to a body of apparatus and the video output from the apparatus is projected onto the screen from the front.

This projection type display apparatus is a front projection type display apparatus in which video is projected onto a screen attached to an apparatus body (the apparatus itself and the screen are integrally provided) Therefore, it is not necessary to attach a screen on a wall or the like at home, contrary to a conventional front projection type display apparatus. Also, it is not necessary to contain the light pass from the projection lens to a screen in a housing, contrary to a conventional rear projection type display apparatus, so that the apparatus can be small-sized. Accordingly, even if the apparatus is set in comparatively narrow space such as at home, a place for setting the apparatus can be more freely selected.

Further, in this projection type display apparatus a screen consists of a liquid crystal panel using polymer-dispersed liquid crystal. This screen is made to be a light-dispersing state (opaque) capable of projecting video and is made to be light-transmitting state (transparent) capable of being inconspicuous when video is not projected (when the projection type display apparatus is not used). Accordingly, the screen is not conspicuous, contrary to a conventional projection type display apparatus, when the apparatus is not used. Further, as described above, this projection type display apparatus can be smaller than a rear projection type display apparatus. Thus, even if the apparatus is used in comparatively narrow space such as at home, a feeling of uncomfortable oppression shall not be given when the apparatus is not used.

Further, a liquid crystal panel constituting the screen employs polymer-dispersed liquid crystal that disperses light when a voltage is applied, and that transmits light when a voltage is not applied. Therefore, when video is not projected, the screen can be transparent without applying a voltage, so that a consumption of a standby power can be reduced when not used.

Moreover, in this projection type display apparatus, it is suitable for further providing, for example, an adjustment means for adjusting a size of video projected onto a screen and a control means for controlling the adjustment means in accordance with an aspect ratio of the video to be projected.

On a screen having a predetermined shape, an area where the video is not projected is changed depending on an aspect ratio of the video to be projected. Therefore, by adjusting the size of video that is projected onto a screen in accordance with the aspect ratio, video having various aspect ratios can be projected onto a screen of a predetermined shape at a maximum angle of view, respectively.

Moreover, in this projection type display apparatus, it is suitable for further providing: a judgment means for distinguishing an aspect ratio of the video projected by the input video signal and a control means for controlling the adjustment means by this judgment means in accordance with the aspect ratio distinguished by the judgment means.

Further, in this projection type display apparatus, it is suitable for providing an elliptical-shaped screen.

In this projection type display apparatus, since a screen becomes transparent when not used, a user's awareness of the screen becomes lower. Then, by making a screen elliptical in shape, the safety can be enhanced when not used (even if a user touches a screen without notice, a user can not be injured because of no-corners therein).

Further, in case a screen is made elliptical-shaped as described above, an area where the video is not projected occurs surrounding a square shaped area where the video is projected. In addition, the area without projected video is changed according to an aspect ratio of the projected video. Then, when an aspect ratio of the projected video is distinguished and the size video projected onto a screen is adjusted in accordance with this aspect ratio, video having various aspect ratios can be projected onto an elliptical screen at a maximum angle of view, respectively.

Furthermore, for example, a screen is more suitable to have an ecliptic shape in which the ratio of a major axis to a minor axis is approximately 1.3 to 1.7. Within the range, conventional video having various aspect ratios (video of NTSC/PAL system with an aspect ratio of 4:3, video of Hi-Vision system with an aspect ratio of 16:9, video of Cinemascope and so on) can be projected with a minimum percentage of unused area where none of those videos are projected in an elliptical-shaped screen.

Further, in this projection type display apparatus, for example, an electrode is provided with a liquid crystal panel constituting a screen so that the area where video is projected is distinguished from the area where video is not projected, and when video is projected, it is suitable for light to be dispersed only in the area where video is projected of a liquid crystal panel by means of an electrode voltage control means that controls a voltage applied to this electrode.

Accordingly, when video is projected, the area where the video is not projected at a screen becomes a light-transmitting state (transparent). Therefore, the video can be displayed as floating in the air (without making a user conscious of the presence of the screen).

Next, the applicants of the present invention provide a projection type display apparatus which projects video onto a screen, including: a liquid crystal panel using polymer-dispersed liquid crystal that is attached to a body of apparatus as a screen, and an adjustment means for adjusting the size of video projected onto the screen and a control means for controlling the adjustment means in accordance with an aspect ratio of the projected video.

This projection type display apparatus is a front projection type display apparatus in which video is projected onto a screen attached to a body of an apparatus from the front (namely, a body of apparatus and a screen are integrally provided). Thus, it is not necessary to attach a screen on a wall or the like at home, contrary to a conventional front projection type display apparatus. Further, it is not necessary to contain the part of optical pass from a projection lens to a screen in the housing contrary to a conventional rear projection type display apparatus, so that the apparatus can be small-sized. With this, a place for setting the apparatus can be selected more freely, even if it is set in a comparatively narrow space such as at home.

Further, in this projection type display apparatus a screen consists of a liquid crystal panel using polymer-dispersed liquid crystal. Onto this screen, video can be projected in the state in which light is dispersed (opaque), and on the contrary the screen is made to be inconspicuous in the state in which light is transmitted (transparent), when video is not projected (when the projection type display apparatus is not used). Thus, a screen is not conspicuous when not used, contrary to a conventional projection type display apparatus. Further, as described above, this projection type display apparatus can be small-sized than a rear projection type display apparatus. Accordingly, a feeling of uncomfortable oppression is not given, even in a comparatively small space such as at home when not used.

Further, on a screen of predetermined shape, an area where video is not projected changes depending on an aspect ratio of projected video; however, by adjusting the size of the video projected onto a screen in accordance with this aspect ratio, video having various aspect ratios can be projected at a maximum angle of view onto the screen having a predetermined shape, respectively.

Furthermore, it is suitable for this projection type display apparatus to be provided with a judgment means for distinguishing an aspect ratio of projected video of the input video signal and a control means for controlling the adjustment means in accordance with an aspect ratio distinguished by the judgment means.

Further, it is suitable for the projection type display apparatus to have a screen in elliptical shape.

In this projection type display apparatus, since a screen becomes transparent when not used, a user's awareness of a screen becomes lower. Then, by making a screen elliptical in shape, the safety can be enhanced when not used (even if a user touches a screen without notice, a user can not be injured, because of no-corners therein).

Furthermore, in case a screen is made elliptical-shaped as described above, an area where the video is not projected occurs surrounding a square shaped area where the video is projected and the area without projected video is changed according to an aspect ratio of the projected video; however, when an aspect ratio of the projected video is distinguished and the size of projected video onto a screen is adjusted in accordance with this aspect ratio, video having a various aspect ratios can be projected onto an elliptical screen at a maximum angle of view, respectively.

Furthermore, for example, it is more suitable for a screen to have an ecliptic shape in which the ratio of a major axis to a minor axis is approximately 1.3 to 1.7. Within the range, conventional video having various aspect ratios (video of NTSC/PAL system with an aspect ratio of 4:3, video of Hi-Vision system with an aspect ratio of 16:9, video of Cinemascope and so on) can be projected with a minimum percentage of unused area where none of those videos are projected in an elliptical-shaped screen.

Further, in this projection type display apparatus, for example, an electrode is provided with a liquid crystal panel constituting a screen so that the area where video is projected is distinguished from the area where video is not projected, and when video is projected, it is suitable for light to be dispersed only in the area where video is projected of a liquid crystal panel by means of an electrode voltage control means that controls a voltage applied to this electrode.

Accordingly, when video is projected, the area where the video is not projected at a screen becomes a light-transmitting state (transparent). Therefore, the video can be displayed as floating in the air (without making a user conscious of the presence of the screen).

Moreover, it is suitable for a liquid crystal panel constituting a screen to be the one using high polymer dispersion liquid crystal that disperses light when a voltage is applied, and that transmits light when a voltage is not applied.

Accordingly, when video is not projected, the screen becomes transparent without applying a voltage, a consumption of the stand-by power can be reduced when the apparatus is not used.

BRIEF DESCRIPTION OF DRAWINGS

FIGS. 4A and 4B are views showing an arrangement and a shape of respective ITO electrodes in ITO electrode groups on a glass substrate of FIG. 2;

FIG. 11 is a table showing relations between values of a, b and p of formulas ① and ②, and S1 of formula ③ corresponding to those values and a calculation result of an area of the whole screen;

FIG. 12 is a table showing relations between values of a, b and p of formulas ① and ②, and S1 of formula ③ corresponding to those values and a calculation result of an area of the whole screen;

FIG. 13 shows a table in a ROM of FIG. 7;

FIG. 15 is a table showing a modified example of a table of FIG. 13.

BEST MODE FOR CARRYING OUT THE INVENTION

Figure 1:
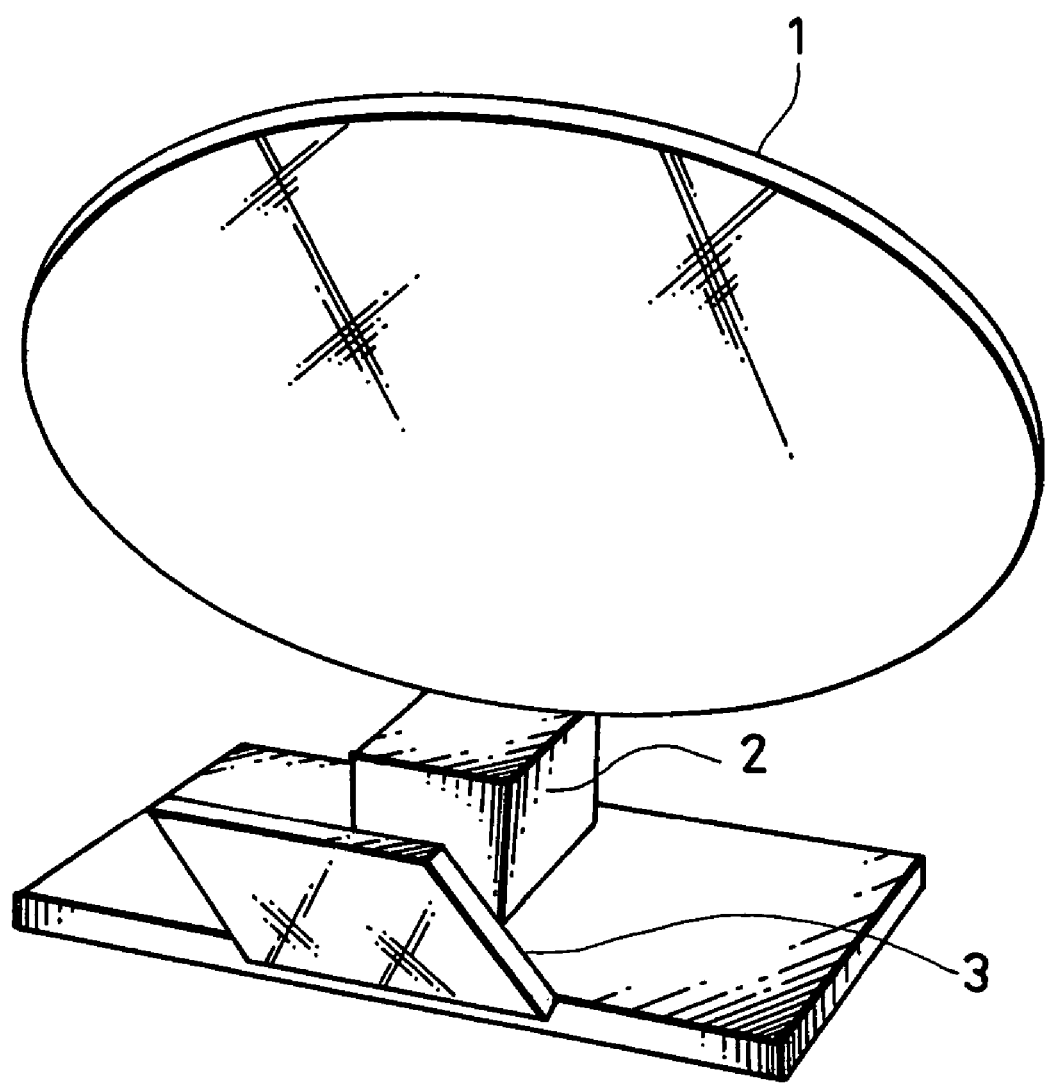
FIG. 1 is a perspective view showing an outer appearance of a video display apparatus according to the present invention.

Hereinafter, the present invention will specifically be explained referring to the drawings.

FIG. 1 shows an outer appearance of a video projection apparatus according to the present invention. In the video projection apparatus, a screen 1 and a mirror 3 which reflects light projected from an apparatus body 2 onto the screen 1 are attached to the apparatus body 2.

The screen 1 is elliptical in shape, and the ratio of the length of a minor axis to that of a major axis is in the range of 1.3 to 1.7 by the reason which is mentioned later.

Figure 2:
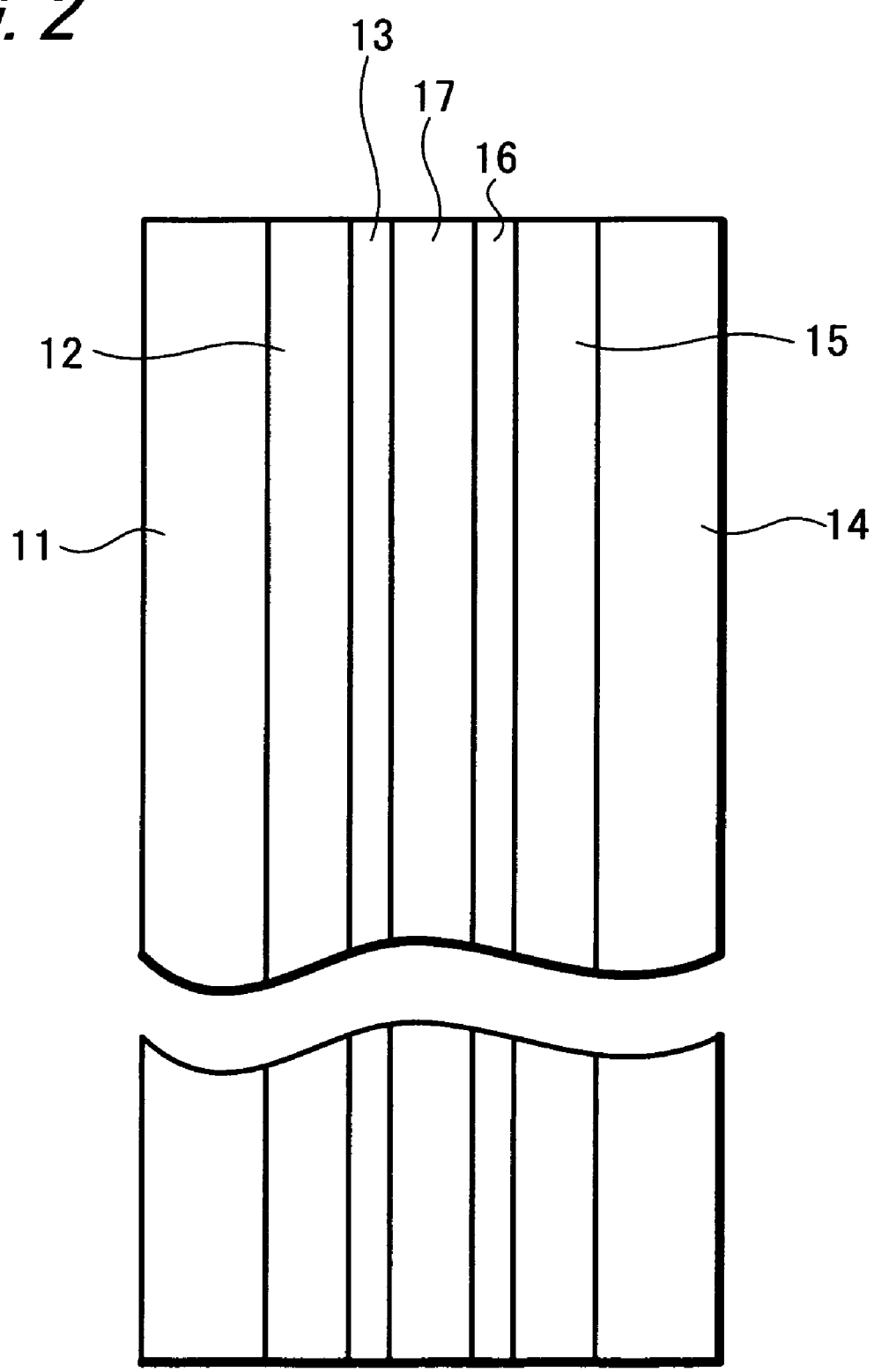
FIG. 2 is a view showing a cross-sectional structure of a screen of FIG. 1.

The screen 1 is composed of a liquid crystal panel using polymer-dispersed liquid crystal. FIG. 2 shows a cross sectional structure of the screen 1. Between an ITO electrode group 13 which is composed of a plurality of ITO electrodes formed on a glass substrate 11 through PET material 12 and an ITO electrode group 16 which is composed of a plurality of ITO electrodes formed on a glass substrate 14 through PET material 15, a liquid crystal layer 17 having the thickness of about several ten micron is held. The liquid crystal panel used for the screen 1 is composed of the ITO electrode group 13, liquid crystal layer 17, and ITO electrode group 16; and the ITO electrode groups 13 and 16 are formed in the directions of intersecting each other (at right angles).

Figure 3B:
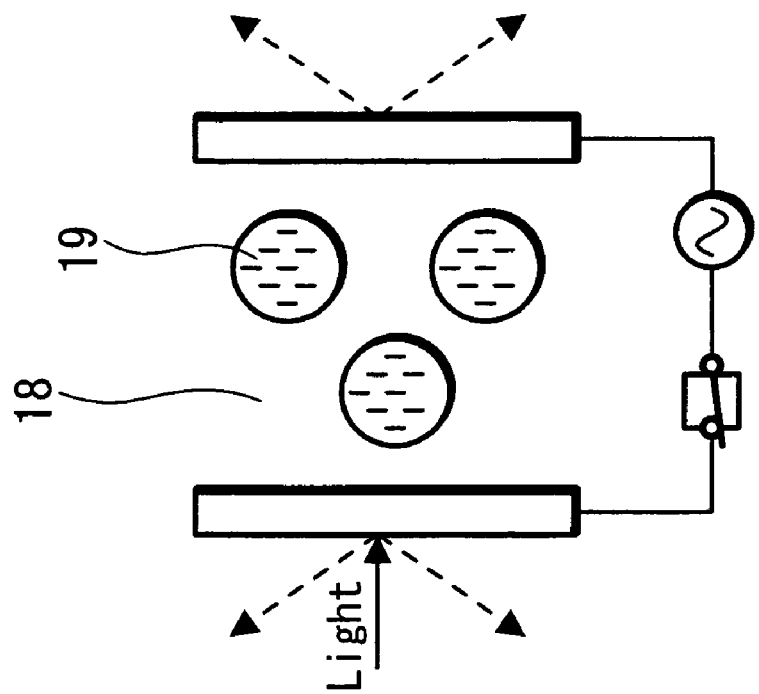
FIGS. 3A and 3B are views showing a composition and characteristic of a liquid crystal layer of FIG. 2.
Figure 3A:
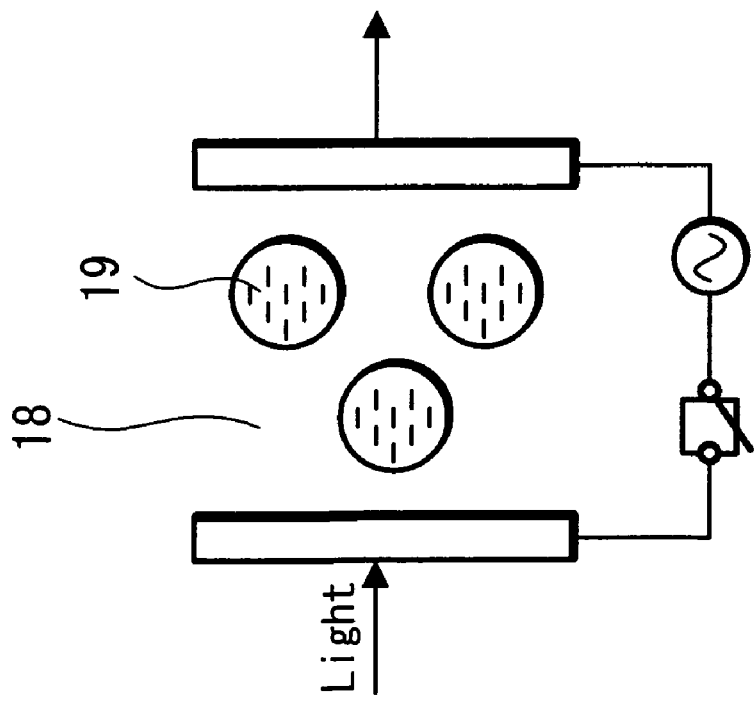

FIGS. 3A and 3B show a composition and characteristic of the liquid crystal layer 17. The liquid crystal layer 17 is a compound substance of polymer material 18 and dispersion-type liquid crystal molecules 19, and as shown in FIG. 3A, when a voltage is not applied, the light-transmissivity becomes high (becomes transparent) with the dispersion-type liquid crystal molecules 19 being aligned, on the other hand, as shown in FIG. 3B, when a voltage is applied, light is dispersed (becomes opaque).

As described above, contrary to conventional polymer-dispersed liquid crystal (that disperses light when a voltage is not applied to, and transmits light when a voltage is applied to), the liquid crystal panel constituting the screen 1 employs polymer-dispersed liquid crystal that disperses light when a voltage is applied to and transmits light when a voltage is not applied to.

Note that, such polymer-dispersed liquid crystal that disperses light when a voltage is applied to and transmits light when a voltage is not applied to, is introduced at page 392 in Appl. Phys. Lett. 60 (3) issued on Jan. 21, 1992, for example.

FIGS. 4A and 4B show arrangement and shape of each ITO electrode in the ITO electrode group 13 on the glass substrate 11 and those of each ITO electrode in the ITO electrode group 16 on the glass substrate 14, respectively. As shown in FIG. 4A, in the ITO electrode group 13, pairs of ITO electrodes 13(1), ITO electrodes 13(2), and ITO electrodes 13(3) are arranged in order from the far end symmetrically with respect to the major axis of an ellipse of the screen 1, and an ITO electrode 13(4) is arranged in the remaining region.

As shown in FIG. 4B, in the ITO electrode group 16, pairs of ITO electrodes 16(1), ITO electrodes 16(2), and ITO electrodes 16(3) are arranged in order from the far end symmetrically with respect to the minor axis of an ellipse of the screen 1, and an ITO electrode 16(4) is arranged in the remaining region.

Figure 5A:
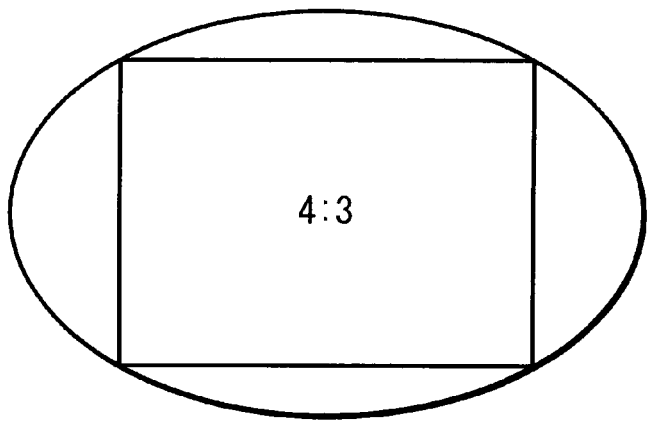
FIGS. 5A to 5C are views showing the range in which ITO electrodes in ITO electrode groups on two glass substrates of FIG. 2 are lapped over.
Figure 5B:
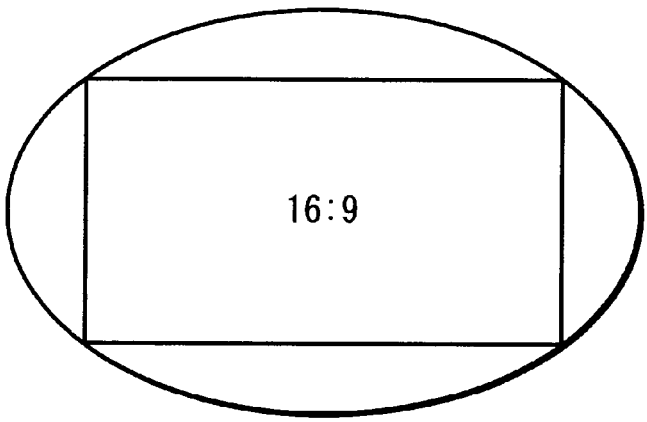
Figure 5C:
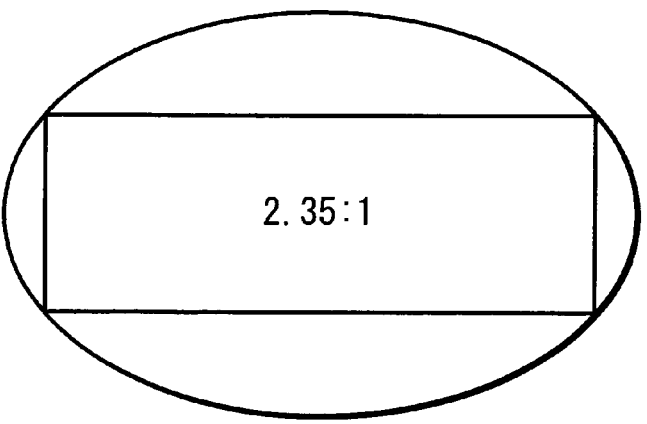

FIGS. 5A to 5C each show the range in which respective ITO electrodes in the ITO electrode group 13 and respective ITO electrodes in the ITO electrode group 16 are lapped over on the screen 1. As shown in FIG. 5A, the range of the ITO electrodes 13(2) through 13(4) and the ITO electrode 16(4) lapped over is a square in which the ratio of a horizontal length and a vertical length is 4:3 with four corners thereof positioned on the circumference of an ellipse.

As shown in FIG. 5B, the range in which the ITO electrodes 13(3) and 13(4), and the ITO electrode 16(4) are lapped over is a square in which the ratio of a horizontal length and a vertical length is 16:9 with four corners thereof positioned on the circumference of an ellipse.

As shown in FIG. 5C, the range in which the ITO electrode 13(4) and the ITO electrodes 16(2) through 16(4) are lapped over is a square in which a horizontal length and a vertical length is 2.35:1 with four corners thereof positioned on the circumference of an ellipse.

Figures 6, 8:
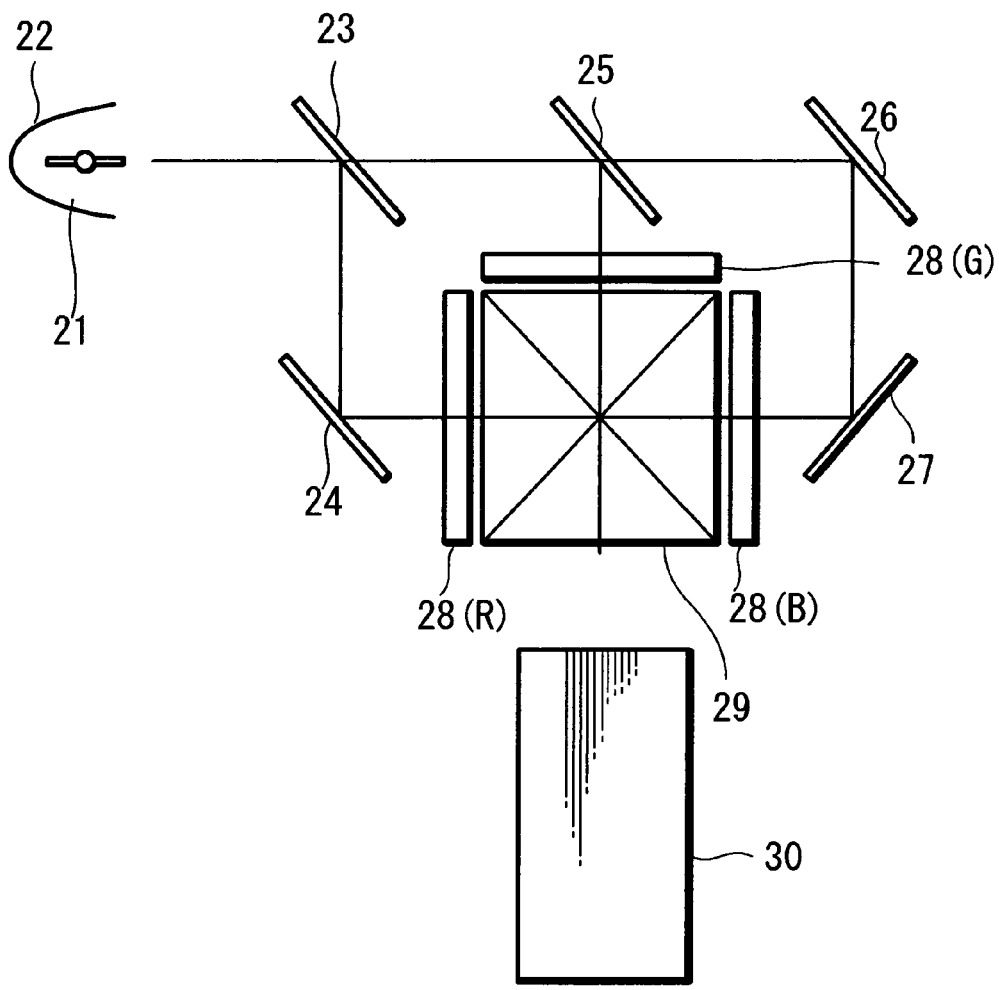
FIG. 6 is a view showing a basic construction of the optical system of an apparatus body of FIG. 1.
FIG. 8 shows a table in a ROM of FIG. 7.

The apparatus body 2 in FIG. 1 is a three-panel transmissive type liquid crystal projector. FIG. 6 shows a basic construction of an optical system of the apparatus body 2. Light emitted from a UHP lamp (high pressure mercury lamp) 21 is made to be parallel by a reflector 22 and enters a dichroic-mirror 23.

Red light in the light entered the dichroic-mirror 23 is reflected by the dichroic-mirror 23, and reflected by a mirror 24 to be irradiated to a liquid crystal panel 28(R).

Further, green light in the light entered the dichroic-mirror 23 is transmitted by the dichroic-mirror 23, reflected by a dichroic-mirror 25, and then is irradiated to a liquid crystal panel 28(G).

Further, blue light in the light entered the dichroic-mirror 23 is transmitted by the dichroic-mirrors 23 and 25 respectively, and reflected by mirrors 26 and 27 respectively, then irradiated to a liquid crystal panel 28 (B).

Then, red light, green light, and blue light which are modulated in accordance with the video signal of R, G, and B, respectively at a liquid crystal panel 28(R), 28(G), and 28(B) are combined at a dichroic-mirror 29 to be emitted from a projection lens 30, and then projected onto the screen 1 through the mirror 3.

Figure 7:
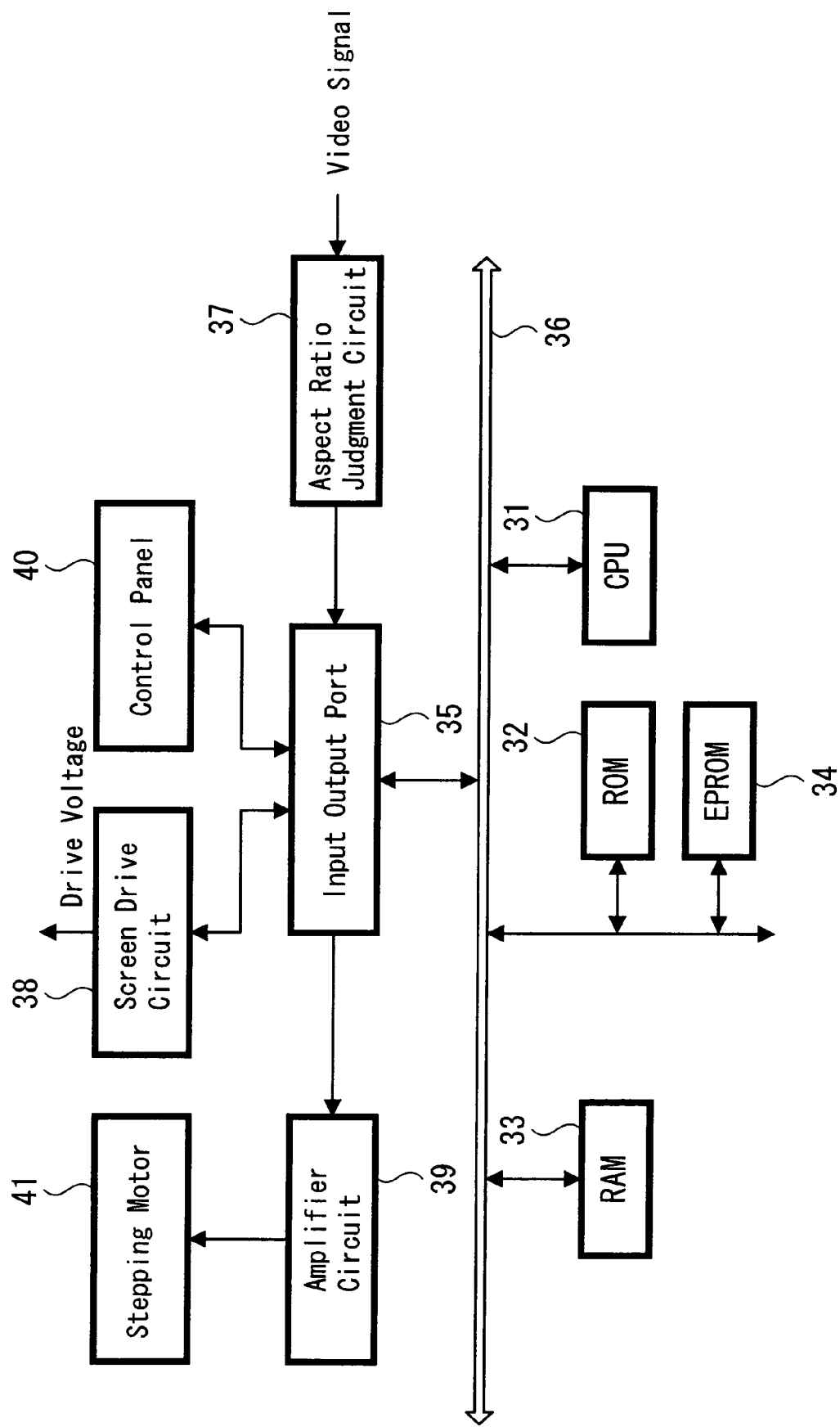
FIG. 7 is a block diagram showing a part of a circuit composition of an apparatus body of FIG. 1, which is relevant to the present invention.

FIG. 7 shows a part of circuit configuration of the apparatus body 2 relevant to the present invention (circuits and others which drive a liquid crystal panel 28(R), 28(G), 28(B), and the like in FIG. 6 are not explained).

A CPU 31, a ROM 32, a RAM 33, a EPROM 34 and an input-output port 35 are connected to each other through a bus 36. To the input-output port 35, an aspect ratio judgment circuit 37, a screen drive circuit 38, an amplifier circuit 39, a group of control keys of a control panel 40 (not shown in FIG. 1) on the surface of the apparatus body 2, and a display are connected.

The aspect ratio judgment circuit 37 distinguishes an aspect ratio of the video signals input to the apparatus body 2 from outside and supplies the signal showing the judgment result to the CPU 31 through the input-output port 35 and the bus 36.

The screen drive circuit 38 supplies a drive voltage to respective ITO electrodes in the ITO electrode groups 13 and 16 (FIG. 2, FIG. 4) of the screen 1 (FIG. 1) based upon a control signal supplied from the CPU 31 through the bus 36 and input-output port 35.

A stepping motor 41 that is a zoom mechanism of the projection lens 30 (FIG. 6) is connected to the amplifier circuit 39.

Figure 14:
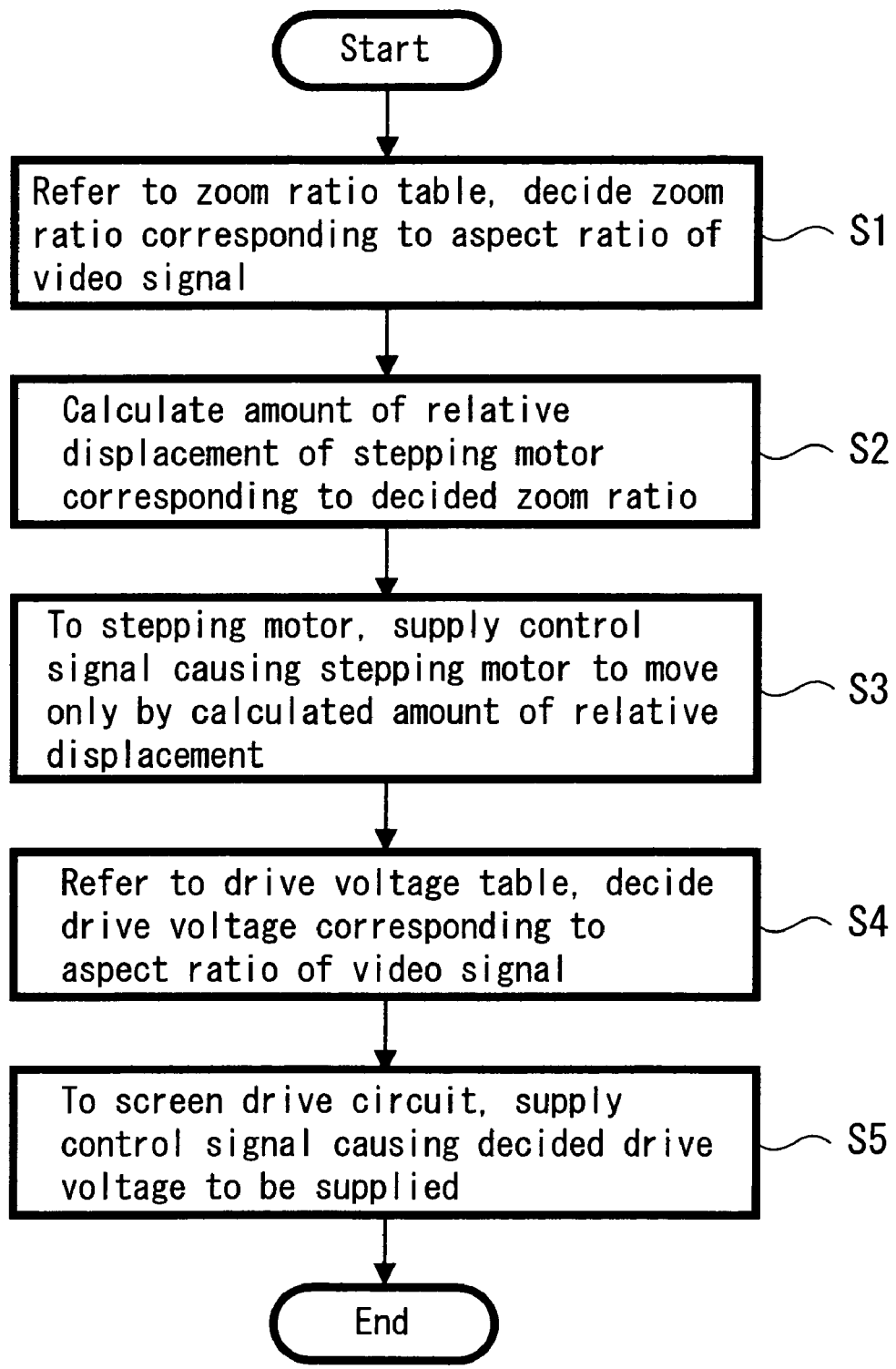
FIG. 14 is a flow chart showing a zoom ratio control and a screen drive processing performed by a CPU of FIG. 7.

The CPU 31 controls respective parts of the projection type display apparatus by executing a program stored in the ROM 32. Programs of zoom ratio control and a screen drive processing as shown in later described FIG. 14 are also included in the ROM 32.

Also, a table (zoom ratio table) in which an aspect ratio of a video signal is made to correspond to data of a zoom ratio of the projection lens 30, and a table (drive voltage table) in which the aspect ratio of the video signal is made to correspond to a drive voltage of respective ITO electrodes of the ITO electrode groups 13 and 16 of the screen 1, are stored in the ROM 32.

FIG. 8 shows contents of the zoom ratio table in the ROM 32. Also, FIG. 9A to 9C each show the ranges in the screen 1, where video is projected according to a content of the zoom ratio table.

Figure 9A:
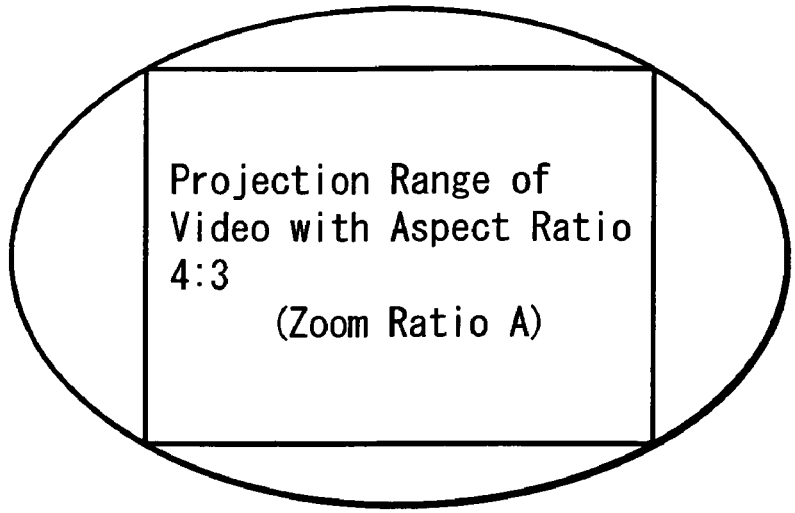
FIGS. 9A to 9C are views each showing the range in a screen of FIG. 1, where video is projected in accordance with a content in the table of FIG. 8.

As shown in FIG. 8, a zoom ratio A (A is a constant) corresponds to an aspect ratio of 4:3 (aspect ratio of NTSC/PAL system), and the amount of zoom 1.17A corresponds to an aspect ratio of 16:9 (aspect ratio of Hi-Vision system) and the amount of zoom 1.31A corresponds to an aspect ratio of 2.35:1 (aspect ratio of Cinemascope system) As shown in FIG. 9A, the zoom ratio A is a value, with which four corners of video having the aspect ratio of 4:3 projected onto a screen 1 are exactly positioned on the circumference of an ellipse thereof (namely, the video is projected in the range where ITO electrodes 13(2) to 13(4), and the ITO electrode 16(4) are exactly lapped over, as shown in FIG. 5A).

Figure 9B:
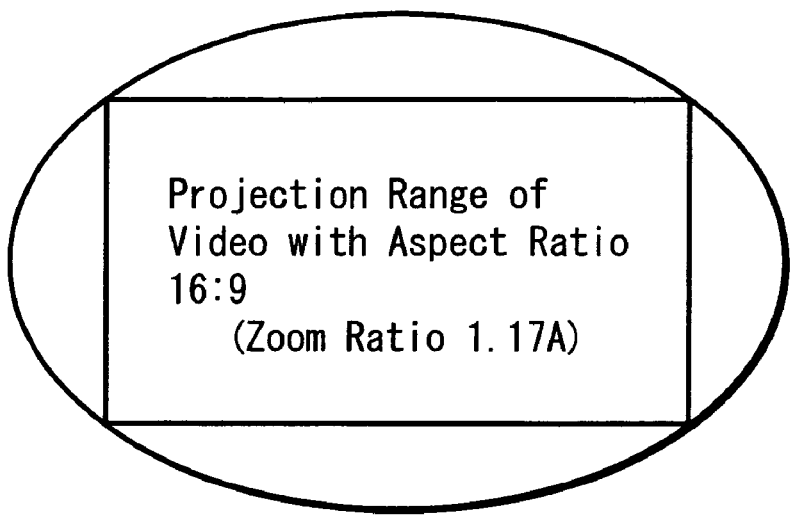
Figure 9C:
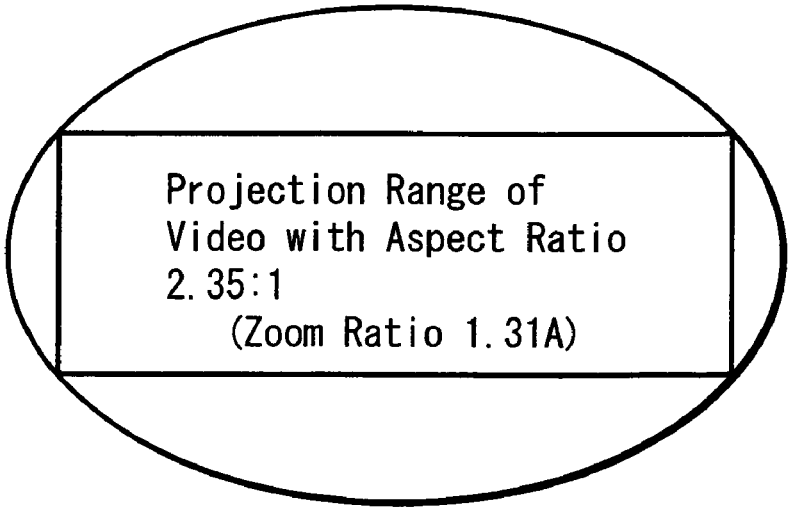

When the zoom ratio A is the above value, in the zoom ratio of 1.17A, as shown in FIG. 9B, four corners of the video having the aspect ratio of 16:9 projected onto the screen 1 are exactly positioned on the circumference of an ellipse thereof (namely, the video is projected in the range where ITO electrodes 13(3) and 13(4), and ITO electrodes 16(3) and 16(4) are exactly lapped over, as shown in FIG. 5B), and in the zoom ratio 1.31A, as shown in FIG. 9C, four corners of the video having the aspect ratio of 2.35:1 projected onto the screen 1 are exactly positioned on the circumference of an ellipse thereof (namely, the video is projected in the range where an ITO electrode 13(4), and ITO electrodes 16(2) to 16(4) are exactly lapped over, as shown FIG. 5C).

As described above, when four corners of video rojected onto the screen 1 are located on the circumference of an ellipse thereof, the video is projected onto the screen 1 at the maximum angle of view. However, in order to position four corners of video having the aspect ratio of 4:3 on the circumference of an ellipse of the screen 1, each length of the major and minor axes of an ellipse of the screen 1 is set to a and b respectively, each of the vertical and horizontal lengths of the projected video is set as 3k and 4k, respectively (though k is a constant, here, k=1 as a matter of convenience), and the following formula ① must be satisfied.

$$4^2/a^2 + 3^2/b^2 = 1 \qquad (1)$$

Also, in order to position four corners of video having an aspect ratio Ar (Ar is a ratio other than 4:3) on the circumference of an ellipse of the screen 1, the horizontal length of the video projected onto the screen 1 is set to p·k (here, also k=1), and the following formula ② must be satisfied.

$$p^2/a^2 + (p \times Ar)^2/b^2 = 1 \qquad (2)$$

Figure 10:
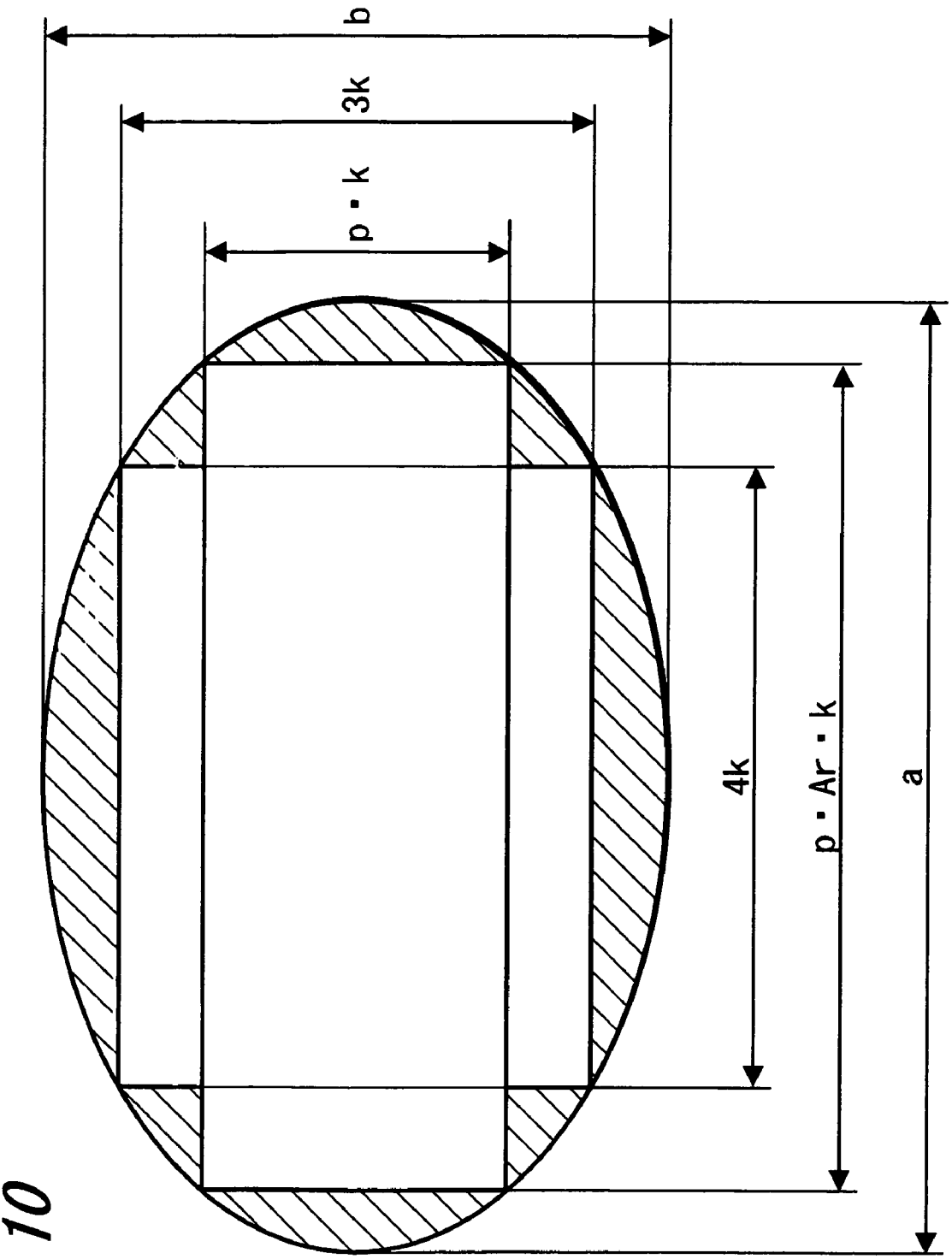
FIG. 10 is a view showing an unused area in a screen of FIG. 1, where video is not projected.

Then, in case of projecting the video having the aspect ratio of 4:3 and the video having the aspect ratio of Ar onto a screen 1 such that four corners thereof are respectively positioned on the circumference of an ellipse of the screen 1, the shaded area specified in the screen 1 of FIG. 10 is an unused area where none of the video is projected. An area S1 of the area where video is not projected is shown by the following formula ③.

$$S1 = \pi \times a \times b - (4 \times 3) \times 4 - (p-4) \times Ar \times p \times 4 \qquad (3)$$

FIG. 11 shows, when the aspect ratio Ar is set to 16:9 (the aspect ratio of Hi-Vision system), relationships between values of a, b, and p that satisfy above formulas ①, ②, and the calculation results of an area S1 and the whole area of screen 1 with a/b (a ratio of a length of major axis to a length of minor axis of an ellipse of screen 1) being within the range from 1.3 to 1.7.

When a/b is in the range from 1.3 to 1.7, the calculation result is obtained that the ratio of an area S1 (an area onto which both the video of an aspect ratio of 4:3 and the video of an aspect ratio of 16:9 are not projected) to the whole area of screen 1 becomes small compared to the case in which a/b is not in this range.

Further, FIG. 12 shows, when the aspect ratio Ar is set to 2.35:1 (an aspect ratio of Cinemascope system), relationships between values of a, b, and p that satisfy above formulas ①, ②, and the calculation result of an area S1 and the whole area of screen 1 with a/b (a ratio of a length of major axis to a length of minor axis of an ellipse of screen 1) being within the range from 1.3 to 1.7.

When a/b is in the range from 1.3 to 1.7, the calculation result is obtained that the ratio of an area S1 (an area onto which both the video of an aspect ratio of 4:3 and the video of an aspect ratio of 2.35:1 are not projected) to the whole area of screen 1 becomes small compared to the case in which a/b is not in this range.

As described above, when a/b (a ratio of the length of major axis to the length of minor axis of an ellipse of screen 1) is set within the range from 1.3 to 1.7, a ratio of unused area, where none of the video is projected, to the whole screen could be small. By that reason, the ratio of the length of minor axis to the length of major axis is set within the range from 1.3 to 1.7.

FIG. 13 shows contents of a table of drive voltage in the aforementioned ROM 32. To the aspect ratio of 4:3 (an aspect ratio of NTSC/PAL system) a drive voltage corresponds, in which a voltage is applied between ITO electrodes 13(2) to 13(4) in the ITO electrode group 13 and ITO electrode 16(4) in the ITO electrode group 16; and between ITO electrode 13(1) in the ITO electrode group 13 and ITO electrodes 16(1) to 16(3) in the ITO electrode group 16 (ITO electrodes 13(2) to 13(4) have equal electric potential to ITO electrodes 16(1) to 16(3), and are further equal to electric potential ITO electrode 13(1) and ITO electrode 16(4)).

This drive voltage is such voltage that causes only an area where ITO electrodes 13(2) to 13(4) and ITO electrode 16(4) are lapped over to be opaque (FIG. 5A), and that causes the remaining part to be transparent, with respect to the screen 1.

To the aspect ratio of 16:9 (an aspect ratio of Hi-Vision system), a drive voltage corresponds, in which a voltage is applied between ITO electrodes 13(3) and 13(4) in the ITO electrode group 13 and ITO electrodes 16(3) and 16(4) in the ITO electrode group 16; and between ITO electrodes 13(1) and 13(2) in the ITO electrode group 13 and ITO electrodes 16(1) and 16(2) in the ITO electrode group 16 (ITO electrodes 13(3) and 13(4) have equal electric potential to ITO electrodes 16(1) and 16(2), and are further equal to the electric potential of ITO electrode 13(1) and 13(2), and ITO electrodes 16(3) and 16(4)).

This drive voltage is such voltage that causes only an area where ITO electrodes 13(3) and 13(4), and ITO electrodes 16(3) and 16(4) are lapped over to be opaque (FIG. 5B), and causes the remaining part to be transparent, with respect to the screen 1.

To the aspect ratio of 2.35:1 (an aspect ratio of Cinemascope system), a drive voltage corresponds, in which a voltage is applied between ITO electrode 13(4) in the ITO electrode group 13 and ITO electrodes 16(2) to 16(4) in the ITO electrode group 16; and between ITO electrodes 13(1) to 13(3) in the ITO electrode group 13 and ITO electrode 16(1) in the ITO electrode group 16 (ITO electrode 13(4) has equal electric potential to ITO electrode 16(1), and is further equal to the electric potential of ITO electrodes 13(1) to 13(3) and ITO electrodes 16(2) to(4)).

This drive voltage is such voltage that causes only an area where ITO electrode 13(4) and ITO electrodes 16(2) to 16(4) are lapped over to be opaque (FIG. 5C), and causes the remaining part to be transparent, with respect to the screen 1.

In FIG. 7, various types of data generated in the process of the CPU 31 executing a program in the ROM 32 are temporally stored in the RAM 33. Data indicating the present position of the stepping motor 41 is stored in the EPROM 34.

FIG. 14 is a flow chart showing zoom ratio control and screen drive processing performed by the CPU 31. This processing starts, when a signal indicating a judgment result of an aspect ratio is transmitted from the aspect ratio judgment circuit 37; and first, referring to the table of a zoom ratio in the ROM 32 (FIG. 8), and a zoom ratio corresponding to the aspect ratio distinguished by the aspect ratio judgment circuit 37 is decided as the zoom ratio of the projection lens 30 (Step S1).

Next, based upon the data of present position of the stepping motor 41 in the EPROM 34a and the zoom ratio decided in Step 1, an amount of relative displacement of the stepping motor 41 to make the projection lens 30 have this decided zoom ratio is calculated (Step S2).

Further, a control signal which makes the stepping motor 41 move only by the amount of relative displacement calculated at Step S2, is supplied to the stepping motor 41 through the bus 36, input-output port 35, and amplifier circuit 39 (Step S3).

Subsequently, referring to the table of drive voltage in the ROM 32 (FIG. 13), a drive voltage corresponding to the aspect ratio distinguished by the aspect ratio judgment circuit 37 is decided as a drive voltage of the screen 1 (Step S4).

Then, a control signal which causes the decided drive voltage to be supplied to respective ITO electrodes of the ITO electrode groups 13 and 16 (FIG. 2, FIG. 4) of the screen 1 (FIG. 1) is supplied to the screen drive circuit 38 through the Bus 36 and the input-output port 35 (Step S5). Then, the processing is finished.

Next, there will be explained the effectiveness of the above projection type display apparatus being set in comparatively small space such as at home.

The above projection type display apparatus is a front projection type display apparatus (namely, the apparatus body 2 and the screen 1 are integrally provided) in which video is projected onto a screen 1 attached to the apparatus body 2 from a front side. Therefore, there is no need to install a screen on a wall or the like at home, contrary to a conventional front projection type display apparatus. Also, being different from a conventional rear projection type display apparatus, since the part of optical pass from a projection lens to a screen (part of the optical pass from the projection lens 30 of FIG. 6 to the mirror 3 and screen 1 of FIG. 1) is not contained in the housing, the apparatus can be small-sized. Accordingly, for example at home, the apparatus can be put on a table and can be brought to another room, so that a place for setting the apparatus can more freely be selected.

Further, in this projection type display apparatus the screen 1 is composed of a liquid crystal panel using polymer-dispersed liquid crystal. The screen 1 can be made to be in the state of dispersing light (opaque) for projecting video, and to be in the state of transmitting light (transparent) when the video is not projected (when the projection type display apparatus is not used) so that the screen is not conspicuous. Accordingly, the screen shall not be conspicuous contrary to a conventional projection type display apparatus, when not used. Further, as described above, this projection type display apparatus is smaller in size than a rear projection type display apparatus. By this reason, for example at home, a feeling of uncomfortable oppression is not given to the living environment when the apparatus is not used.

Furthermore, the liquid crystal panel constituting the screen 1 uses polymer-dispersed liquid crystal that disperses light when a voltage is applied, and that transmits light when a voltage is not applied. Therefore, when video is not projected, the screen 1 can be transparent without applying a voltage, so that a consumption of standby power can be reduced when the apparatus is not used.

Furthermore, in this projection type display apparatus, the awareness of a user about the screen becomes lower, because the screen 1 is transparent when not used; however, since the screen 1 is elliptical-shaped, the safety is enhanced when the apparatus is not used (even if a user touches a screen without notice, the user can not be injured, because of no-corners therein).

Subsequently, the operation and effectiveness of this projection type display apparatus, when video is projected, will be explained.

When the video signal having an aspect ratio of 4:3 (NTSC/PAL system) is input into the apparatus body 2 of this projection type display apparatus, since the aspect ratio of 4:3 is distinguished in the aspect ratio judgment circuit 37 (FIG. 7), with the zoom ratio control and screen drive processing (FIG. 14) of the CPU 31 (FIG. 7) the video is projected onto the screen 1, as shown in FIG. 9A, such that four corners of the video having aspect ratio of 4:3 are exactly positioned on the circumference of an ellipse of the screen 1 (specifically, the video is projected onto the range where ITO electrodes 13(2) to 13(4) and ITO electrode 16(4) of FIG. 5A are lapped over), and a drive voltage, which causes only the above range of ITO electrodes 13(2) to 13(4) and ITO electrode 16(4) being lapped over to be opaque, is supplied to the screen 1.

Therefore, since a part where the video is projected onto the screen 1 (the range where ITO electrodes 13(2) to 13(4) and ITO electrode 16(4) are lapped over) becomes opaque, the video can be seen from a front side of the screen 1 and also, a part where the video is not projected of the screen 1 remains transparent.

On the other hand, when the video signal having an aspect ratio of 16:9 (Hi-Vision system) is input into the apparatus body 2 of this projection type display apparatus, since the aspect ratio of 16:9 is distinguished in the aspect ratio judgment circuit 37, with the zoom ratio control and screen drive processing of the CPU 31 the video is projected onto the screen 1, as shown in FIG. 9B, such that four corners of the video having aspect ratio of 16:9 are exactly positioned on the circumference of an ellipse of the screen 1 (specifically, the video is projected onto the range where ITO electrodes 13(3) and 13(4), and ITO electrodes 16(3) and 16(4) of FIG. 5B are lapped over), and a drive voltage, which causes only the above range of ITO electrodes 13(3) and 13(4) and ITO electrodes 16(3) and 16(4) being lapped over to be opaque, is supplied to the screen 1.

Therefore, since an area where the video is projected onto the screen 1 (the range where ITO electrodes 13(3) and 13(4), and ITO electrode 16(3) and 16(4) are lapped over) becomes opaque, the video can be seen from a front side of the screen 1 and also, a part where the video is not projected of the screen 1 remains transparent.

On the other hand, when the video signal having an aspect ratio of 2.35:1 (Cinemascope) is input into the apparatus body 2 of this projection type display apparatus, since the aspect ratio of 2.35:1 is distinguished in the aspect ratio judgment circuit 37, with the zoom ratio control and screen drive processing of the CPU 31 the video is projected onto the screen 1, as shown in FIG. 9C, such that four corners of the video having aspect ratio of 2.35:1 are exactly positioned on the circumference of an ellipse of the screen 1 (specifically, the video is projected onto the range where ITO electrodes 13(4) and ITO electrodes 16(2) to 16(4) of FIG. 5C are lapped over), and a drive voltage, which causes only the above range of ITO electrode 13(4) and ITO electrodes 16(2) to 16(4) being lapped over to be opaque, is supplied to the screen 1.

Therefore, since an area where the video is projected onto the screen 1 (the range where ITO electrode 13(4) and ITO electrodes 16(2) to 16(4) are lapped over) becomes opaque, the video can be seen from a front side of the screen 1 and also, a part where the video is not projected of the screen 1 remains transparent.

As described above, when any one of videos having the aspect ratio of 4:3 (NTSC/PAL system), aspect ratio of 16:9 (Hi-Vision system), and aspect ratio of 2.35:1 (Cinemascope system) is projected, four corners of the video projected onto the screen 1 are exactly located on the circumference of an ellipse thereof, so that the video is projected onto a screen 1 with the maximum angle of view.

Further, since the ratio of the length of major axis to the length of minor axis is set within the range of 1.3 to 1.7, the proportion of an unused area, where none of the videos of the aspect ratio of 4:3, of the aspect ratio of 16:9, and of the aspect ratio 2.35:1 (Cinemascope) is projected, to the whole area of the screen 1, becomes as small as possible, as shown in FIGS. 11 and 12.

Moreover, ITO electrodes 13(1) through 13(4) and ITO electrodes 16(1) through 16(4) are provided with a liquid crystal panel constituting the screen 1 to distinguish an area where video is projected and an area where the video is not projected, and when any one of videos of the aspect ratio of 4:3, of the aspect ratio of 16:9, and of the aspect ratio of 2.35:1 (Cinemascope system) is projected, the part of the screen 1, where the video is not projected, remains transparent. Therefore, display can be performed such that the video is floating in the air (without a user being conscious of the presence of the screen 1).

Note that, in the above embodiments, a table in the ROM 32, ITO electrode groups 13 and 16 of a liquid crystal panel constituting the screen 1, and a zoom ratio control and screen drive processing of the CPU 31 correspond to the three aspect ratios of 4:3, 16:9, and 2.35:1. However, the present invention is not limited thereto, and those tables, ITO electrode groups 13 and 16, and the processing may correspond to aspect ratios other than those of 4:3, 16:9, and 2.35:1 (for example, corresponds to an aspect ratio of 1.85 (American-Vista)).

Further, in the above embodiments, in the zoom ratio control and screen drive processing of the CPU 31 the zoom ratio is decided uniquely by the judgment result of the aspect ratio judgment circuit 37. However, as another embodiment, there may be the case in which when a user performs an operation of specifying a zoom ratio with a control panel 40, the specified zoom ratio is given priority.

Furthermore, in the above embodiments, the case in which the screen 1 is elliptical in shape is mentioned; however, the outer appearance of the screen 1 is not limited thereto, and the preset invention can be applied to various shapes. In the predetermined shape of screen regardless of rectangular or circular, the area where video is not projected is changed according to an aspect ratio of the video to be projected. Accordingly, by adjusting a size of the video projected onto a screen in accordance with the aspect ratio, videos with various aspect ratios can be projected onto a predetermined shaped screen with the maximum angle of view, respectively.

Further, in the above embodiments, a liquid crystal panel constituting the screen 1 uses polymer-dispersed liquid crystal that disperses light when a voltage is applied, and that transmits light when a voltage is not applied. However, as another embodiment, a conventional polymer-dispersed liquid crystal (that disperses light when a voltage is not applied, and transmits light when a voltage is applied) can be used.

In that case, if contents of the table of drive voltage in a ROM 32 (FIG. 13) is changed into that shown in FIG. 15, when any one of videos of the aspect ratio of 4:3, of the aspect ratio of 16:9, and of the aspect ratio of 2.35:1 is projected, the part of a screen 1, where video is not projected, could also be transparent and the video can be displayed as floating in the air.

Further, in the above embodiments, the apparatus body 2 is a three-panel transmissive type liquid crystal projector.

However, as another embodiment, the apparatus body 2 may be a single-panel transmissive type liquid crystal projector, a projector using a spatial light modulating element (for example, DMD (Digital Mirror Device)), or a projector using a CRT.

Further, in the above embodiments, although the light from the apparatus body 2 is reflected by the mirror 3 and is projected onto the screen 1, the light from an apparatus body can directly be projected onto the screen.

Further, in the above embodiments, although the video is projected from the apparatus body 2 to be obtained as the diffused light on a screen 1 and a user watches the video from the front side, there can be another case in which the user watches the video obtained as the diffused light from the rear side.

Further, it is to be understood that the present invention is not limited to the above embodiments and that various structure could be taken without departing from the spirit or scope of the present invention.

As described above, according to a projection type display apparatus of the present invention, even if the apparatus is used in a comparatively small space such as at home, a place for setting the apparatus can be selected more flexibly, and effectiveness of not giving a feeling of uncomfortable oppression is obtained.

Furthermore, effectiveness of reducing the consumption of standby power can be obtained when the apparatus is not used.

Furthermore, effectiveness of projecting videos having various aspect ratios onto a screen of a predetermined shape with the maximum angle of view can be obtained, respectively.

Furthermore, effectiveness of enhancing the safety when not used can be obtained, and the videos with various aspect ratios can be projected onto an elliptical screen with the maximum angle of view, respectively.

Furthermore, effectiveness of projecting various videos with conventional aspect ratios (video of NTSC/PAL system with an aspect ratio of 4:3, video of Hi-Vision system with an aspect ratio of 16:9, video of the Cinemascope, and so on) with a minimum percentage of unused area of an elliptical-shaped screen, where none of those videos are projected, can be obtained.

Furthermore, effectiveness of displaying video such that the video is floating in the air (without a user being conscious of the presence of the screen) can be obtained.

The invention claimed is:

1. A projection type display apparatus that projects video onto a screen, comprising:
a liquid crystal panel using polymer-dispersed liquid crystal that disperses light when a voltage is applied and that transmits light when a voltage is not applied, being attached to a body of the apparatus as a screen,
wherein said liquid crystal panel comprises:
a first group of electrodes including a first predetermined number of electrodes; and
a second group of electrodes including a second predetermined number of electrodes;
wherein said first group of electrodes is arranged in a direction perpendicular to a direction in which said second group of electrodes is arranged;
wherein the video output from said body of the apparatus is projected onto said screen from the front side, and
wherein each of a four corners of a plurality of aspect ratios of video are located on the circumference of an ellipse shaped screen,
a location of each of the four corners being a function of the aspect ratio, and
wherein said screen transmits light in an area of the screen where said video is not projected.

2. A projection type display apparatus according to claim 1, wherein video is projected onto said screen through a mirror.

3. A projection type display apparatus according to claim 1 further comprising:
adjustment means for adjusting the size of video that is projected onto said screen, and
control means for controlling said adjustment means in accordance with an aspect ratio of the projected video.

4. A projection type display apparatus according to claim 3, wherein
an electrode is provided with said liquid crystal panel to distinguish the area where video is projected from the area where the video is not projected, and
according to the aspect ratio of said video, said control means controls a voltage supplied to said electrode such that light is dispersed only at the area where video is projected in said liquid crystal panel.

5. A projection type display apparatus according to claim 3, further comprising:
judgment means for distinguishing an aspect ratio of the video projected by input video signals, and
control means for controlling said adjustment means in accordance with said aspect ratio distinguished by said judgment means.

6. A projection type display apparatus according to claim 3, wherein said screen is elliptical in shape.

7. A projection type display apparatus according to claim 6, wherein said screen has an elliptical shape in which the ratio of a major axis to a minor axis is within the range approximately from 1.3 to 1.7.

8. A projection type display apparatus according to claim 1, wherein
an electrode is provided with said liquid crystal panel to distinguish the area where video is projected from the area where the video is not projected, and
when video is projected, light is dispersed by an electrode voltage control means that controls a voltage supplied to said electrode only at the area where the video is projected in said liquid crystal panel.

9. A projection type display apparatus according to claim 8, wherein
said liquid crystal panel comprises: a liquid crystal layer, a first electrode that is provided on the front side of said liquid crystal layer and that consists of a plurality of areas in a predetermined direction, and a second electrode that is provided on the rear side of said liquid crystal layer and that consists of a plurality of areas in a direction perpendicular to said predetermined direction; and
light is dispersed by said electrode voltage control means at said area where said first electrode and said second electrode, both of which are supplied with said voltage, are lapped over.

10. A projection type display apparatus that projects video onto a screen comprising:
a liquid crystal panel using polymer-dispersed liquid crystal, being attached to a body of apparatus as a screen,
adjustment means for adjusting the size of video projected onto said screen,
control means for controlling said adjustment means in accordance. with an aspect ratio of the projected video, wherein said liquid crystal panel comprises:
a first group of electrodes including a first predetermined number of electrodes; and
a second group of electrodes including a second predetermined number of electrodes;
wherein said first group of electrodes is arranged in a direction perpendicular to a direction in which said second group of electrodes is arranged;
wherein each of a four corners of a plurality of aspect ratios of video are located on the circumference of an ellipse shaped screen,
a location of each of the four corners being a function of the aspect ratio, and
wherein when the video is projected onto the screen, a part of the screen where said video is not projected remains transparent.

11. A projection type display apparatus according to claim 10, further comprising:
judgment means for distinguishing an aspect ratio of video projected by input video signals, and
control means for controlling said adjustment means in accordance with said aspect ratio distinguished by said judgment means.

12. A projection type display apparatus according to claim 10, wherein said screen is elliptical in shape.

13. A projection type display apparatus according to claim 12, wherein said liquid crystal panel has an elliptical shape in which a ratio of a major axis to a minor axis is within the range approximately from 1.3 to 1.7.

14. A projection type display apparatus according to claim 10, wherein
an electrode is provided with said liquid crystal panel to distinguish the area where video is projected from the area where the video is not projected, and
when video is projected, light is dispersed by an electrode voltage control means that controls a voltage supplied to said electrode only at the area where the video is projected in said liquid crystal panel.

15. A projection type display apparatus according to claim 14, wherein
said liquid crystal panel comprises: a liquid crystal layer, a first electrode that is provided on the front side of said liquid crystal layer and that consists of a plurality of areas in a predetermined direction, and a second electrode that is provided on the rear side of said liquid crystal layer and that consists of a plurality of areas in a direction perpendicular to said predetermined direction; and
light is dispersed by said electrode voltage control means at said area where said first electrode and said second electrode, both of which are supplied with said voltage, are lapped over.

16. A projection type display apparatus according to claim 10, wherein said liquid crystal panel uses polymer-dispersed liquid crystal that disperses light when a voltage is applied and that transmits light when a voltage is not applied.

* * * * *